(12) United States Patent
Xiao et al.

(10) Patent No.: US 10,712,870 B2
(45) Date of Patent: Jul. 14, 2020

(54) METHOD FOR IMPROVING FAULT TOLERANCE OF TOUCHSCREEN AND TOUCHSCREEN TERMINAL

(71) Applicant: Huawei Technologies Co., Ltd., Shenzhen (CN)

(72) Inventors: Wenchao Xiao, Wuhan (CN); Shaowu Hu, Wuhan (CN); Gang Xu, Shenzhen (CN); Rui Zhang, Wuhan (CN); Wushuang Jiang, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 98 days.

(21) Appl. No.: 15/758,602

(22) PCT Filed: Sep. 9, 2015

(86) PCT No.: PCT/CN2015/089253
§ 371 (c)(1),
(2) Date: Mar. 8, 2018

(87) PCT Pub. No.: WO2017/041249
PCT Pub. Date: Mar. 16, 2017

(65) Prior Publication Data
US 2018/0275826 A1  Sep. 27, 2018

(51) Int. Cl.
*G09G 5/00* (2006.01)
*G06F 3/041* (2006.01)
*G06F 3/044* (2006.01)

(52) U.S. Cl.
CPC ............ *G06F 3/0418* (2013.01); *G06F 3/044* (2013.01)

(58) Field of Classification Search
CPC ...... G06F 3/0418; G06F 3/044–3/0448; G06F 2203/04101

(Continued)

(56) References Cited

U.S. PATENT DOCUMENTS 8,441,462 B2  5/2013  Kobayashi et al.
2010/0295816 A1  11/2010  Zhang
(Continued)

FOREIGN PATENT DOCUMENTS

CN    101644983 A    2/2010
CN    102799321 A    11/2012
(Continued)

OTHER PUBLICATIONS

Machine Translation and Abstract of Chinese Publication No. CN103235672, Aug. 7, 2013, 10 pages.

(Continued)

*Primary Examiner* — Jennifer T Nguyen
(74) *Attorney, Agent, or Firm* — Conley Rose, P.C.

(57) ABSTRACT

A method for improving fault tolerance of a touchscreen determines an abnormal node, and shield the abnormal node to improve the fault tolerance of the touchscreen. The method includes detecting a capacitance value of each node in the touchscreen, comparing the detected capacitance value of each node with a preset capacitance value of each node to determine N target nodes, where N is an integer greater than or equal to zero, and the target nodes are nodes whose capacitance values vary, determining whether an abnormal node is included in the N target nodes, where the abnormal node is a target node determined when no touch operation occurs on the touchscreen, and discarding a row value, a column value, and a capacitance variation value of the abnormal node when the abnormal node is included in the N target nodes.

20 Claims, 3 Drawing Sheets

◇ Normal node   ◆ Abnormal node (58) Field of Classification Search
USPC .................................................. 345/173–178
See application file for complete search history.

(56) References Cited

U.S. PATENT DOCUMENTS

| | | | |
|---|---|---|---|
| 2012/0092297 A1 | 4/2012 | Han | |
| 2013/0234987 A1 | 9/2013 | Ye et al. | |
| 2014/0160059 A1 | 6/2014 | Chung | |
| 2014/0354578 A1* | 12/2014 | Cheng | G06F 3/044 345/174 |
| 2016/0124575 A1* | 5/2016 | Yashiro | G06F 3/044 345/173 |
| 2018/0253167 A1* | 9/2018 | Park | G06F 3/044 |

FOREIGN PATENT DOCUMENTS

| | | |
|---|---|---|
| CN | 103235672 A | 8/2013 |
| CN | 103713206 A | 4/2014 |
| TW | 201423533 A | 6/2014 |
| WO | 2014208129 A1 | 12/2014 |

OTHER PUBLICATIONS

Foreign Communication From a Counterpart Application, Chinese Application No. 201580082963.3, Chinese Office Action dated Jun. 4, 2019, 6 pages.
Machine Translation and Abstract of Chinese Publication No. CN103713206, Apr. 9, 2014, 18 pages.
Foreign Communication From a Counterpart Application, PCT Application No. PCT/CN2015/089253, English Translation of International Search Report dated May 31, 2016, 3 pages.
Foreign Communication From a Counterpart Application, PCT Application No. PCT/CN2015/089253, English Translation of Written Opinion dated May 31, 2016, 7 pages.
Machine Translation and Abstract of International Publication No. WO2014208129, Dec. 31, 2014, 37 pages.
Foreign Communication From a Counterpart Application, Chinese Application No. 201580082963.3, Chinese Office Action dated Nov. 12, 2019, 5 pages.

* cited by examiner

METHOD FOR IMPROVING FAULT TOLERANCE OF TOUCHSCREEN AND TOUCHSCREEN TERMINAL

CROSS-REFERENCE TO RELATED APPLICATION

This application is a U.S. National Stage of International Patent Application No. PCT/CN2015/089253 filed on Sep. 9, 2015, which is hereby incorporated by reference in its entirety.

TECHNICAL FIELD

The present disclosure relates to the field of touch control and display technologies, and in particular, to a method for improving fault tolerance of a touchscreen and a touchscreen terminal.

BACKGROUND

A multi-touch capacitive touchscreen includes an on-cell touchscreen and an in-cell touchscreen. A node that is used by the on-cell touchscreen and the in-cell touchscreen to implement touch control may be a bonding pad. A large quantity of nodes are used on the on-cell screen, for example, a 7-inch liquid crystal display (LCD) with a resolution of 600×1024 requires 15×26 nodes, that is, 390 nodes. Due to a complex process, a larger quantity of nodes increases the probability of abnormal nodes. For example, if a node is in poor contact, an impedance of the node becomes larger, and further, a capacitance of the node cannot be fully charged. As a result, a capacitance value of the node frequently fluctuates.

Generally, a touchscreen of a touchscreen terminal detects a capacitance value of each node in the touchscreen. When the touchscreen receives a touch operation of a user, a capacitance value of a corresponding node within coverage of a touch area varies. When a variation value of the capacitance value exceeds a threshold, the touchscreen reports the node to an application processor of the touchscreen terminal, then the application processor determines the touch operation according to coordinates of the node and a report time, and finally the screen terminal executes a function corresponding to the touch operation, such as unlocking the screen.

Because the capacitance value of the abnormal node fluctuates frequently, the touchscreen detects that the variation of the capacitance value of the abnormal node exceeds the threshold, and then reports the node to the application processor. Actually, the touchscreen does not receive any touch operation. Instead, due to a spontaneous variation of the capacitance value of the abnormal node, the touchscreen has a poor fault tolerance capability.

SUMMARY

Embodiments of the present disclosure provide a method for improving fault tolerance of a touchscreen and a touchscreen terminal to improve a fault tolerance capability of a touchscreen.

To achieve the foregoing purpose, the embodiments of the present disclosure use the following technical solutions.

According to a first aspect, a method for improving fault tolerance of a touchscreen is disclosed, including detecting a capacitance value of each node in the touchscreen, comparing the detected capacitance value of each node with a preset capacitance value of each node to determine N target nodes, where N is an integer greater than or equal to 0, and a detected capacitance value of the target node and a preset capacitance value of the target node meet a preset condition, determining whether an abnormal node is included in the N target nodes, where the abnormal node is the target node determined when no touch operation occurs on the touchscreen, and discarding a row value, a column value, and a capacitance variation value of the abnormal node if the abnormal node is included in the N target nodes, calibrating a capacitance variation value of the abnormal node, and uploading a row value, a column value, and a calibrated capacitance variation value of the abnormal node if the abnormal node is included in the N target nodes.

With reference to the first aspect, in a first possible implementation of the first aspect, calibrating a capacitance variation value of the abnormal node further includes determining whether the abnormal node is a node within a touch area, where the touch area is an area, in which a touch operation occurs, on the touchscreen, and determining an average value of capacitance variation values of all nodes within the touch area except the abnormal node as the capacitance variation value of the abnormal node if the abnormal node is a node within the touch area.

With reference to the first possible implementation of the first aspect, in a second possible implementation of the first aspect, determining whether the abnormal node is a node within a touch area includes determining whether a capacitance value of a neighboring node of the abnormal node varies, and determining that the abnormal node is a node within the touch area if a capacitance value of at least one of the neighboring node varies.

According to a second aspect, a method for determining an abnormal node in a touchscreen is disclosed, including detecting a capacitance value of each node in the touchscreen when no touch operation occurs on the touchscreen, and comparing the detected capacitance value of each node with a preset capacitance value of each node to determine M abnormal nodes, where M is an integer greater than or equal to 0.

With reference to the second aspect, in a first possible implementation of the second aspect, the method further includes determining whether a distance between any two of the abnormal nodes is less than or equal to a preset distance threshold when M is greater than or equal to 2, and generating prompt information to prompt a terminal user to replace the touchscreen if the distance between the any two of the abnormal nodes is less than or equal to the preset distance threshold.

According to a third aspect, a touchscreen terminal is disclosed, where the touchscreen terminal includes a touchscreen, including a detection unit configured to detect a capacitance value of each node in the touchscreen, a determining unit configured to compare the detected capacitance value of each node with a preset capacitance value of each node to determine N target nodes, where N is an integer greater than or equal to 0, and a detected capacitance value of the target node and a preset capacitance value of the target node meet a preset condition, a judging unit configured to determine whether an abnormal node is included in the N target nodes, where the abnormal node is the target node determined when no touch operation occurs on the touchscreen, and an execution unit configured to discard a row value, a column value, and a capacitance variation value of the abnormal node when the judging unit determines that the abnormal node is included in the N target nodes, or calibrate a capacitance variation value of the abnormal node, and upload a row value, a column value, and a calibrated capacitance variation value of the abnormal node when the judging unit determines that the abnormal node is included in the N target nodes.

With reference to the third aspect, in a first possible implementation of the third aspect, when calibrating a capacitance variation value of the abnormal node, the execution unit is further configured to determine whether the abnormal node is a node within a touch area, where the touch area is an area, in which a touch operation occurs, on the touchscreen, and determine an average value of capacitance variation values of all nodes within the touch area except the abnormal node as the capacitance variation value of the abnormal node if the abnormal node is a node within the touch area.

With reference to the first possible implementation of the third aspect, in a second possible implementation of the third aspect, when determining whether the abnormal node is a node within a touch area, the execution unit is further configured to determine whether a capacitance value of a neighboring node of the abnormal node varies, and determine that the abnormal node is a node within the touch area if a capacitance value of at least one of the neighboring node varies.

With reference to the third aspect, in a third possible implementation of the third aspect, the touchscreen terminal further includes a storage unit, where the detection unit is further configured to detect the capacitance value of each node in the touchscreen when no touch operation occurs on the touchscreen, and the determining unit is configured to compare the detected capacitance value of each node with the preset capacitance value of each node to determine M abnormal nodes, where M is an integer greater than or equal to 0.

With reference to the third possible implementation of the third aspect, in a fourth possible implementation of the third aspect, the touchscreen terminal further includes a judging unit and a generation unit, where the judging unit is configured to determine whether a distance between any two of the abnormal nodes is less than or equal to a preset distance threshold when M is greater than or equal to 2, and the generation unit is configured to generate prompt information to prompt a terminal user to replace the touchscreen when the judging unit determines that the distance between the any two of the abnormal nodes is less than or equal to the preset distance threshold.

According to a fourth aspect, a touchscreen terminal is disclosed, including a processor configured to detect a capacitance value of each node in the touchscreen, and compare the detected capacitance value of each node with a preset capacitance value of each node to determine N target nodes, where N is an integer greater than or equal to 0, and a detected capacitance value of the target node and a preset capacitance value of the target node meet a preset condition, where the processor is configured to determine whether an abnormal node is included in the N target nodes, where the abnormal node is the target node determined when no touch operation occurs on the touchscreen, and discard a row value, a column value, and a capacitance variation value of the abnormal node if the abnormal node is included in the N target nodes, calibrate a capacitance variation value of the abnormal node, and upload a row value, a column value, and a calibrated capacitance variation value of the abnormal node if the abnormal node is included in the N target nodes.

With reference to the fourth aspect, in a first possible implementation of the fourth aspect, when calibrating a capacitance variation value of the abnormal node, the processor is further configured to determine whether the abnormal node is a node within a touch area, where the touch area is an area, in which a touch operation occurs, on the touchscreen, and determine an average value of capacitance variation values of all nodes within the touch area except the abnormal node as the capacitance variation value of the abnormal node if the abnormal node is a node within the touch area.

With reference to the first possible implementation of the fourth aspect, in a second possible implementation of the fourth aspect, when determining whether the abnormal node is a node within a touch area, the processor is further configured to determine that the abnormal node is a node within the touch area if a capacitance value of at least one of the neighboring node varies.

With reference to the fourth aspect, in a third possible implementation of the fourth aspect, the processor is further configured to detect the capacitance value of each node in the touchscreen when no touch operation occurs on the touchscreen, and compare the detected capacitance value of each node with the preset capacitance value of each node to determine M abnormal nodes, where M is an integer greater than or equal to 0.

With reference to the third possible implementation of the fourth aspect, in a fourth possible implementation of the fourth aspect, the processor is further configured to determine whether a distance between any two of the abnormal nodes is less than or equal to a preset distance threshold when M is greater than or equal to 2, and generate prompt information to prompt a terminal user to replace the touchscreen if the distance between the any two of the abnormal nodes is less than or equal to the preset distance threshold.

According to the method for improving fault tolerance of a touchscreen and the touchscreen terminal in the embodiments of the present disclosure, a capacitance value of each node in the touchscreen is detected, the detected capacitance value of each node is compared with a preset capacitance value of each node to determine N target nodes, row values and column values of the N target nodes are determined, and whether an abnormal node is included in the target nodes is determined. If the abnormal node is included in the N target nodes, a row value, a column value, and a capacitance variation value of the abnormal node are discarded, or if the abnormal node is included in the N target nodes, a capacitance variation value of the abnormal node is calibrated, and a row value, a column value, and a calibrated capacitance variation value of the abnormal node are uploaded. In this way, when a capacitance value of a node in the touchscreen varies, the abnormal node can be shielded such that the abnormal node has no impact on the touchscreen, and a fault tolerance capability of the touchscreen is improved. Alternatively, when the abnormal node is a node within a touch area, the capacitance variation value of the abnormal node is calibrated, and the capacitance variation value of the abnormal node is set to an average value of capacitance variation values of all nodes within the touch area except the abnormal node such that the abnormal node does not affect touchscreen terminal use of a user, and user experience is improved.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Embodiment 1

Figure 1:
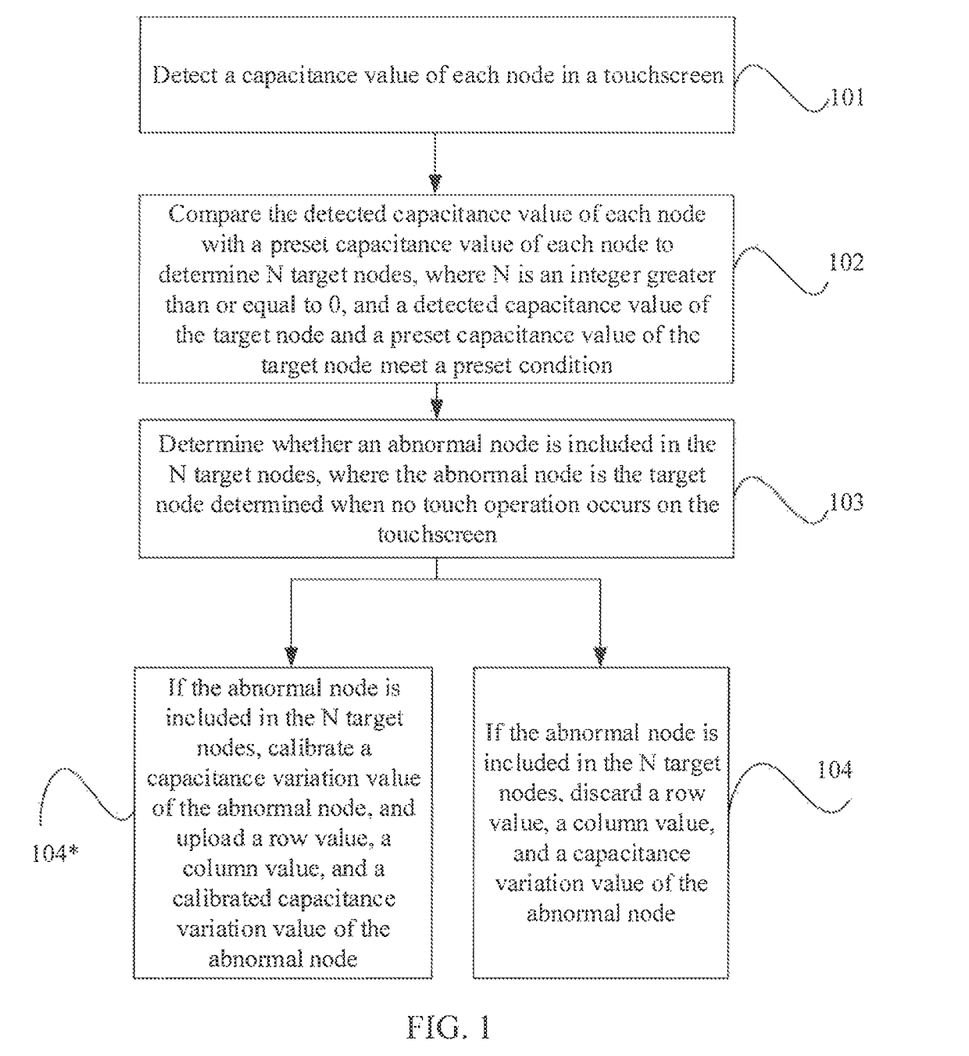
FIG. 1 is a schematic flowchart of a method for improving fault tolerance of a touchscreen according to Embodiment 1 of the present disclosure.

The embodiment of the present disclosure provides a method for improving fault tolerance of a touchscreen. As shown in FIG. 1, the method includes the following steps.

Step 101: Detect a capacitance value of each node in the touchscreen.

The node may be a bonding pad on a touchscreen terminal. The bonding pad is an electrical signal pad that is bonded with the touchscreen, and is also bonded with an electrical signal pad on a flexible printed circuit (FPC).

Step 102: Compare the detected capacitance value of each node with a preset capacitance value of each node to determine N target nodes, where N is an integer greater than or equal to 0, and a detected capacitance value of the target node and a preset capacitance value of the target node meet a preset condition.

The preset capacitance value of each node is pre-stored by the touchscreen terminal in a memory of the touchscreen terminal, and may be a corresponding preset capacitance value set for each node before delivery of the touchscreen terminal or a preset capacitance value of each node that is determined according to a parameter set for each node before delivery of the touchscreen terminal. In addition, the preset capacitance value of each node may vary according to environment and like changes. A specific variation may be adjusted according to specifications in other approaches. This is not limited in this embodiment of the present disclosure.

As mentioned, the detected capacitance value of the target node and the preset capacitance value of the target node meet a preset condition. The preset condition herein may include that the detected capacitance value of the target node is different from the preset capacitance value of the target node, or the detected capacitance value of the target node exceeds the capacitance value of the target node by a preset percentage.

Further, determining a target node may include detecting a capacitance value of each node, determining the node as the target node when a capacitance value of a node is detected as different from a preset capacitance value of the node, and determining the node as the target node when a detected capacitance value of a node and a preset capacitance variation value of the node exceed a preset percentage.

In a specific implementation, determining N target nodes is recording row values and column values of the N target nodes. Generally, nodes are arranged in order in the touchscreen. A row value and a column value represent in which row and which column a node is located in the touchscreen, and coordinates of the node can be determined according to the row value and the column value of the node.

Step 103: Determine whether an abnormal node is included in the N target nodes, where the abnormal node is the target node determined when no touch operation occurs on the touchscreen.

In a specific implementation, a processor of the touchscreen may periodically detect the capacitance value of each node in the touchscreen to obtain a measured capacitance value of each node, calculate a percentage value by which the measured capacitance value of each node in the touchscreen exceeds a corresponding preset capacitance value, and determine a node with the percentage value greater than a preset ratio as an abnormal node. For example, a preset capacitance value of node A is 10 microfarads (μF) and a preset ratio of node A is 30 percent (%). When a measured capacitance value of node A exceeds the preset capacitance value by 30%, node A is determined as an abnormal node, or when a measured capacitance value of node A is 3 μF greater than the preset capacitance value, node A is determined as an abnormal node, that is, when the measured capacitance value of node A is 13 μF, node A is determined as an abnormal node.

In addition, the processor of the touchscreen needs to record a row value and a column value of the abnormal node, and when detecting the capacitance value of each node in the touchscreen to determine the abnormal node, ensure that no touch operation occurs on the touchscreen. For example, the abnormal node may be determined when a user certainly does not perform touch control, in a process in which the touchscreen terminal is powered on or restarted, or in a process in which the touchscreen is lighted using a screen-locking button on the touchscreen terminal.

Step 104: If the abnormal node is included in the N target nodes, discard a row value, a column value, and a capacitance variation value of the abnormal node.

Compare obtained row values and column values of the target nodes with the recorded row value and column value of the abnormal node one by one to determine whether the abnormal node is included in the target nodes.

In a specific implementation, the processor of the touchscreen may discard coordinates of the abnormal node and does not report the coordinates of the abnormal node to an application processor of the touchscreen terminal. Alternatively, the processor of the touchscreen may still report the coordinates of the abnormal node to the application processor of the touchscreen terminal, and the application processor of the touchscreen terminal discards the coordinates of the abnormal node.

It should be noted that step 104 is performed after step 103 or step 104* is performed after step 103. Step 104 and step 104* are parallel solutions. That is, this embodiment of the present disclosure further provides a method for improving fault tolerance of a touchscreen. As shown in FIG. 1, the method includes steps 101 to 103 and step 104*. Steps 101 to 103 are the same as the foregoing steps 101 to 103.

Step 104*: If the abnormal node is included in the N target nodes, calibrate a capacitance variation value of the abnormal node, and upload a row value, a column value, and a calibrated capacitance variation value of the abnormal node.

In a specific implementation, to avoid that an abnormal node affects user experience, the capacitance variation value of the abnormal node may be calibrated when the abnormal node is included in the nodes whose capacitance values vary. Further, whether the abnormal node is a node within a touch area is determined. If the abnormal node is a node within the touch area, an average value of capacitance variation values of all nodes within the touch area except the abnormal node is determined as the capacitance variation value of the abnormal node.

Generally, when a finger (or a marker) touches a screen, a capacitance value of a node within a touch area varies. Therefore, whether a capacitance value of a neighboring node of the abnormal node varies can be determined, and then whether the abnormal node is a node corresponding to the touch area of the touch operation can be determined.

Further, whether the capacitance value of the neighboring node of the abnormal node varies is determined. If the capacitance value of at least one of the neighboring node of the abnormal node varies, it is determined that the abnormal node is a node within the touch area, or if the capacitance value of the neighboring node of the abnormal node does not vary, it is determined that the abnormal node is not a node within the touch area.

Figure 2:
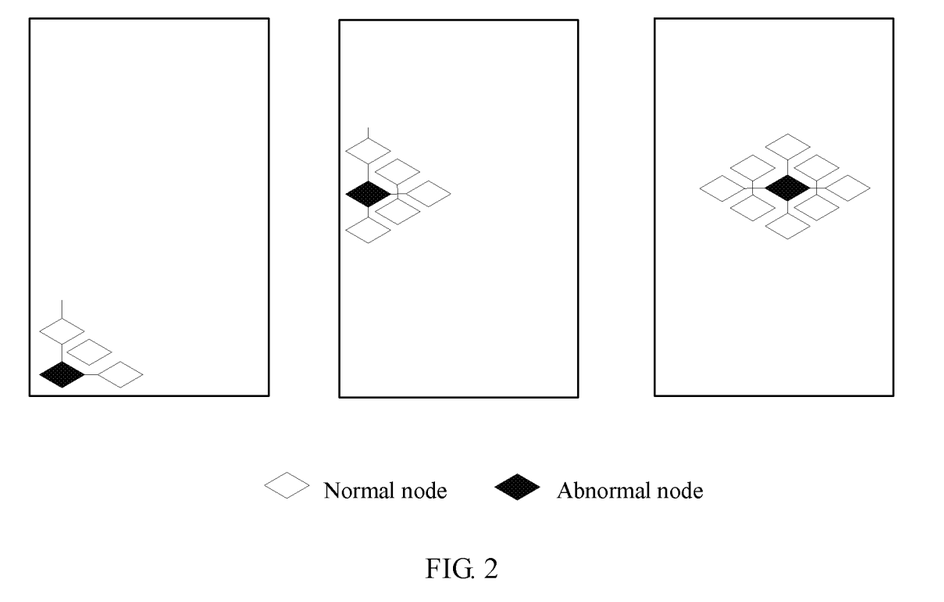
FIG. 2 is a schematic diagram of distribution of an abnormal node according to Embodiment 1 of the present disclosure.

It should be noted that all nodes in the touchscreen terminal are arranged in a matrix form. Therefore, when the abnormal node is in different positions on the touchscreen, quantities of neighboring nodes of the abnormal node are different. As shown in FIG. 2, if the abnormal node is located in one of the four corners of the touchscreen, there are three neighboring nodes. When a capacitance value of at least one of the three nodes varies, the abnormal node can be determined as a node corresponding to the touch operation. In addition, if the abnormal node is located at one edge of the touchscreen, there are five neighboring nodes. When a capacitance value of at least one of the five nodes varies, the abnormal node can be determined as a node corresponding to the touch operation. If the abnormal node is located in a position beyond the four corners and the four edges of the touchscreen, there are eight neighboring nodes. When a capacitance value of at least one of the eight nodes varies, the abnormal node can be determined as a node corresponding to the touch operation.

In a specific implementation, because a finger resembles an ellipse, when a finger touches the screen, the touch area may be an ellipse, curvature radiuses of all nodes on the edges of the ellipse are the same, and capacitance variation values of the nodes are approximately equal. Therefore, determining an average value of capacitance variation values of all nodes within the touch area except the abnormal node as the capacitance variation value of the abnormal node may be setting the capacitance variation value of the abnormal node as an average value of capacitance variation values of the nodes on the edges of the ellipse.

Generally, when a touch occurs on the touchscreen of the touchscreen terminal, the processor of the touchscreen obtains a row value, a column value, and a capacitance value of a node within the touch area, calculates coordinates of a touch point of a to-be-reported node according to a center-of-gravity calculation formula, and then reports the coordinates of the touch point to the processor of the touchscreen terminal. Further, the row value and the column value of the node within the touch area need to be converted into coordinates, and then the coordinates of the touch point are calculated according to the coordinates of each node within the touch area and the center-of-gravity calculation formula. If an abnormal node exists, final calculated coordinates of the to-be-reported node are inaccurate. Therefore, the capacitance variation value of the abnormal node is set as the average value of capacitance variation values of all nodes within the touch area except the abnormal node. This does not affect accuracy of the coordinates of the touch point, and an accurate touch point is reported to the processor of the touchscreen terminal. In this way, user experience is not affected by the abnormal node.

In the method for improving fault tolerance of a touchscreen according to this embodiment of the present disclosure, the foregoing steps may be executed by the processor of the touchscreen or by the processor of the touchscreen terminal. This is not limited herein.

In addition, it should be noted that this embodiment of the present disclosure merely describes a processing manner for a node related to this embodiment of the present disclosure, which is a processing manner for an abnormal node. For a normal node, coordinates of the node are still reported and processed according to other approaches. This is not limited in this embodiment of the present disclosure.

According to the method for improving fault tolerance of a touchscreen in this embodiment of the present disclosure, a capacitance value of each node in the touchscreen is detected, the detected capacitance value of each node is compared with a preset capacitance value of each node to determine N target nodes, row values and column values of the N target nodes are determined, and whether an abnormal node is included in the target nodes is determined. If the abnormal node is included in the target nodes, a row value, a column value, and a capacitance variation value of the abnormal node are discarded, or if the abnormal node is included in the target nodes, a capacitance variation value of the abnormal node is calibrated, and a row value, a column value, and a calibrated capacitance variation value of the abnormal node are uploaded. In this way, when a capacitance value of a node in the touchscreen varies, the abnormal node can be shielded such that the abnormal node has no impact on the touchscreen, and a fault tolerance capability of the touchscreen is improved. Alternatively, when the abnormal node is a node within a touch area, the capacitance variation value of the abnormal node is calibrated, and the capacitance variation value of the abnormal node is set to an average value of capacitance variation values of all nodes within the touch area except the abnormal node such that the abnormal node does not affect touchscreen terminal use of a user, and user experience is improved.

Embodiment 2

Figure 3:
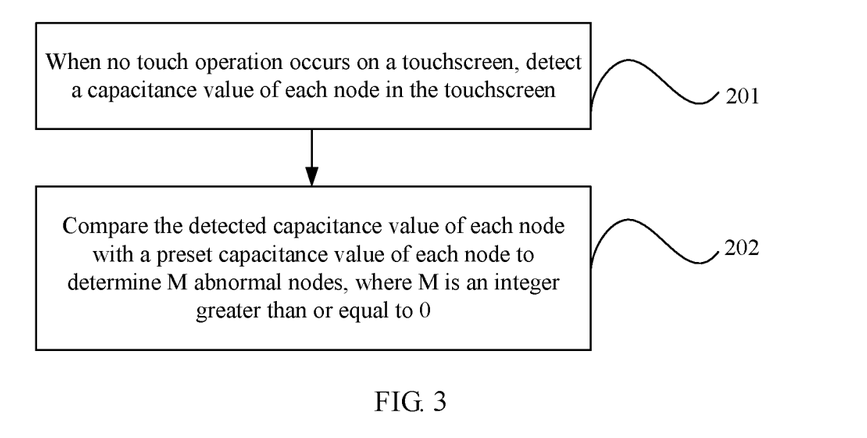
FIG. 3 is a schematic flowchart of a method for determining an abnormal node according to Embodiment 2 of the present disclosure.

The embodiment of the present disclosure further provides a method for determining an abnormal node in a touchscreen. As shown in FIG. 3, the method includes the following steps.

Step 201: When no touch operation occurs on the touchscreen, detect a capacitance value of each node in the touchscreen.

In a specific implementation, an abnormal node needs to be determined when a user certainly does not perform touch control, for example, in a process in which a touchscreen terminal is powered on or restarted, or in a process in which the touchscreen is lighted using a screen-locking button on the touchscreen terminal.

Step 202: Compare the detected capacitance value of each node with a preset capacitance value of each node to determine M abnormal nodes, where M is an integer greater than or equal to 0.

In a specific implementation, a processor of the touchscreen may periodically detect the capacitance value of each node in the touchscreen to obtain a measured capacitance value of each node, calculate a percentage value by which the measured capacitance value of each node in the touchscreen exceeds a corresponding preset capacitance value, and determine a node with the percentage value greater than a preset ratio as an abnormal node. For example, a preset capacitance value of node A is 10 μF and a preset ratio of node A is 30%. When a measured capacitance value of node A exceeds the preset capacitance value by 30%, node A is determined as an abnormal node, or when a measured capacitance value of node A is 3 μF greater than the preset capacitance value, node A is determined as an abnormal node, that is, when the measured capacitance value of node A is 13 μF, node A is determined as an abnormal node.

In a specific implementation, determining M abnormal nodes is recording row values and column values of the M abnormal nodes. Generally, nodes are arranged in order in the touchscreen. A row value and a column value represent in which row and which column a node is located in the touchscreen, and coordinates of the node can be determined according to the row value and the column value of the node.

In a preferred embodiment of the present disclosure, when M is greater than or equal to 2, whether a distance between any two of the abnormal nodes is less than or equal to a preset distance threshold is determined.

If the distance between the any two of the abnormal nodes is less than or equal to the preset distance threshold, prompt information is generated to prompt a terminal user to replace the touchscreen.

The preset distance threshold may be 20 millimeters (mm).

According to the method for determining an abnormal node in a touchscreen in this embodiment of the present disclosure, when no touch operation occurs on the touchscreen, a capacitance value of each node in the touchscreen is detected, and the detected capacitance value of each node is compared with a preset capacitance value of each node to determine M abnormal nodes. In this way, the abnormal node in the touchscreen can be determined, and then a user can be prompted to replace the touchscreen in order to prevent the abnormal node from affecting user experience.

Embodiment 3

Figure 4:
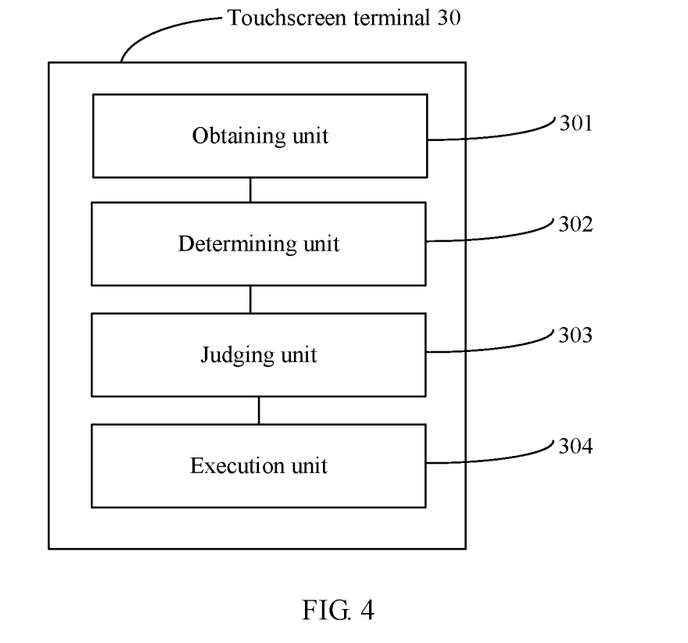
FIG. 4 is a schematic structural diagram of a touchscreen terminal according to Embodiment 3 of the present disclosure.

The embodiment of the present disclosure provides a touchscreen terminal 30. As shown in FIG. 4, the touchscreen terminal 30 includes an obtaining unit 301, a determining unit 302, a judging unit 303, and an execution unit 304.

The obtaining unit 301 is configured to detect a capacitance value of each node in the touchscreen.

The determining unit 302 is configured to compare the detected capacitance value of each node with a preset capacitance value of each node to determine N target nodes, where N is an integer greater than or equal to 0, and a detected capacitance value of the target node and a preset capacitance value of the target node meet a preset condition.

In a specific implementation, determining N target nodes is recording row values and column values of the N target nodes. Generally, nodes are arranged in order in the touchscreen. A row value and a column value represent in which row and which column a node is located in the touchscreen, and coordinates of the node can be determined according to the row value and the column value of the node.

The judging unit 303 is configured to determine whether an abnormal node is included in the N target nodes, where the abnormal node is the target node determined when no touch operation occurs on the touchscreen.

The execution unit 304 is configured to discard a row value, a column value, and a capacitance variation value of the abnormal node when the judging unit 303 determines that the abnormal node is included in the N target nodes, or calibrate a capacitance variation value of the abnormal node, and upload a row value, a column value, and a calibrated capacitance variation value of the abnormal node when the judging unit 303 determines that the abnormal node is included in the N target nodes.

That the execution unit 304 calibrates a capacitance variation value of the abnormal node includes determining whether the abnormal node is a node within a touch area, where the touch area is an area, in which a touch operation occurs, on the touchscreen, and if the abnormal node is a node within the touch area, determining an average value of capacitance variation values of all nodes within the touch area except the abnormal node as the capacitance variation value of the abnormal node.

When determining whether the abnormal node is a node within a touch area, the execution unit 304 is configured to determine whether a capacitance value of a neighboring node of the abnormal node varies, and if a capacitance value of at least one of the neighboring node varies, determine that the abnormal node is a node within the touch area.

In addition, the obtaining unit 301 is further configured to detect the capacitance value of each node in the touchscreen when no touch operation occurs on the touchscreen.

The determining unit 302 is configured to compare the detected capacitance value of each node with the preset capacitance value of each node to determine M abnormal nodes, where M is an integer greater than or equal to 0.

In a specific implementation, determining M abnormal nodes is recording row values and column values of the M abnormal nodes.

The touchscreen terminal 30 further includes a generation unit (not shown).

The judging unit 303 is configured to determine whether a distance between any two of the abnormal nodes is less than or equal to a preset distance threshold when M is greater than or equal to 2, and the generation unit is configured to generate prompt information to prompt a terminal user to replace the touchscreen when the judging unit 303 determines that the distance between the any two of the abnormal nodes is less than or equal to the preset distance threshold.

The preset distance threshold may be 20 mm.

The touchscreen terminal 30 provided in this embodiment of the present disclosure detects a capacitance value of each node in the touchscreen, compares the detected capacitance value of each node with a preset capacitance value of each node to determine N target nodes, determines row values and column values of the N target nodes, determines whether an abnormal node is included in the target nodes, discards a row value, a column value, and a capacitance variation value of the abnormal node if the abnormal node is included in the target nodes, and calibrates a capacitance variation value of the abnormal node, and uploads a row value, a column value, and a calibrated capacitance variation value of the abnormal node if the abnormal node is included in the target nodes. In this way, when a capacitance value of a node in the touchscreen varies, the abnormal node can be shielded such that the abnormal node has no impact on the touchscreen, and a fault tolerance capability of the touchscreen is improved. Alternatively, when the abnormal node is a node within a touch area, the capacitance variation value of the abnormal node is calibrated, and the capacitance variation value of the abnormal node is set to an average value of capacitance variation values of all nodes within the touch area except the abnormal node such that the abnormal node does not affect touchscreen terminal 30 use of a user, and user experience is improved.

Embodiment 3

Figure 5:
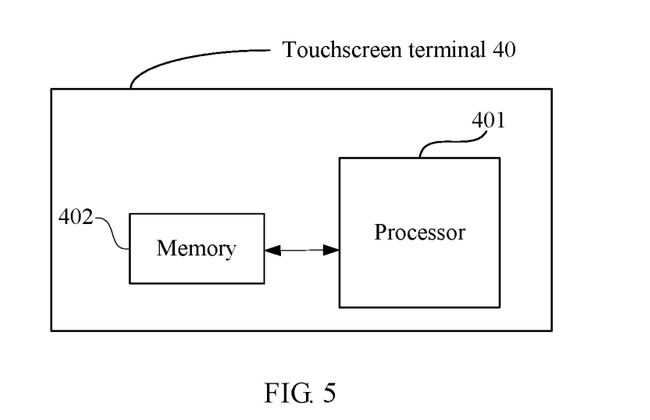
FIG. 5 is a schematic structural diagram of a touchscreen terminal according to Embodiment 4 of the present disclosure.

The embodiment of the present disclosure provides a touchscreen terminal 40. As shown in FIG. 5, the touchscreen terminal 40 includes a processor 401 and a memory 402.

The processor 401 may be a central processing unit (CPU) of a touchscreen of the touchscreen terminal 40 or a processor of the touchscreen terminal 40, and executes various functions of the touchscreen terminal 40 and processes data by running or executing a software program and/or a module stored in the memory 402 and invoking data stored in the memory 402. Optionally, the processor 401 may include one or more processing units. Preferably, an application processor and a modem processor may be integrated into the processor 401. The application processor mainly processes an operating system, a user interface, an application, and so on, and the modem processor mainly processes wireless communication. It may be understood that the modem processor may alternatively be not integrated into the processor 401.

The memory 402 may be configured to store a software program and a module. The processor 401 executes various function applications and data processing of the touchscreen terminal 40 by running the software program and module stored in the memory 402. The memory 402 may mainly include a program storage area and a data storage area. In addition, the memory 402 may include a high-speed random access memory (RAM), and may further include a non-volatile memory such as at least one disk storage device, a flash memory device, or another volatile solid-state storage device.

The processor 401 is configured to detect a capacitance value of each node in the touchscreen, compare the detected capacitance value of each node with a preset capacitance value of each node to determine N target nodes, where N is an integer greater than or equal to 0, and a detected capacitance value of the target node and a preset capacitance value of the target node meet a preset condition, determine whether an abnormal node is included in the N target nodes, where the abnormal node is the target node determined when no touch operation occurs on the touchscreen, discard a row value, a column value, and a capacitance variation value of the abnormal node if the abnormal node is included in the N target nodes, and calibrate the capacitance variation value of the abnormal node, and upload a row value, a column value, and a calibrated capacitance variation value of the abnormal node if the abnormal node is included in the N target nodes.

In a specific implementation, determining N target nodes is recording row values and column values of the N target nodes. Generally, nodes are arranged in order in the touchscreen. A row value and a column value represent in which row and which column a node is located in the touchscreen, and coordinates of the node can be determined according to the row value and the column value of the node.

When calibrating a capacitance variation value of the abnormal node, the processor 401 is further configured to determine whether the abnormal node is a node within a touch area, where the touch area is an area, in which a touch operation occurs, on the touchscreen, and determine an average value of capacitance variation values of all nodes within the touch area except the abnormal node as the capacitance variation value of the abnormal node if the abnormal node is a node within the touch area.

That the processor 401 is configured to determine whether the abnormal node is a node within a touch area is further the processor 401 is configured to determine whether a capacitance value of a neighboring node of the abnormal node varies, and if a capacitance value of at least one of the neighboring nodes varies, determine that the abnormal node is a node within the touch area.

The processor 401 is further configured to detect the capacitance value of each node in the touchscreen when no touch operation occurs on the touchscreen, and compare the detected capacitance value of each node with the preset capacitance value of each node to determine M abnormal nodes, where M is an integer greater than or equal to 0.

In a specific implementation, determining M abnormal nodes is recording row values and column values of the M abnormal nodes.

The processor 401 is configured to determine whether a distance between any two of the abnormal nodes is less than or equal to a preset distance threshold when M is greater than or equal to 2, and generate prompt information to prompt a terminal user to replace the touchscreen if the distance between the any two of the abnormal nodes is less than or equal to the preset distance threshold.

The touchscreen terminal 40 provided in this embodiment of the present disclosure detects a capacitance value of each node in the touchscreen, compares the detected capacitance value of each node with a preset capacitance value of each node to determine N target nodes, determines row values and column values of the N target nodes, determines whether an abnormal node is included in the target nodes, discards a row value, a column value, and a capacitance variation value of the abnormal node if the abnormal node is included in the target nodes, and calibrates a capacitance variation value of the abnormal node, and uploads a row value, a column value, and a calibrated capacitance variation value of the abnormal node if the abnormal node is included in the target nodes. In this way, when a capacitance value of a node in the touchscreen varies, the abnormal node can be shielded such that the abnormal node has no impact on the touchscreen, and a fault tolerance capability of the touchscreen is improved. Alternatively, when the abnormal node is a node within a touch area, the capacitance variation value of the abnormal node is calibrated, and the capacitance variation value of the abnormal node is set to an average value of capacitance variation values of all nodes within the touch area except the abnormal node such that the abnormal node does not affect touchscreen terminal 40 use of a user, and user experience is improved.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for improving fault tolerance of a touchscreen of a user device, wherein the user device comprises the touchscreen, a memory, and a processor coupled to the touchscreen and the memory, wherein the touchscreen comprises a plurality of nodes, and wherein the method comprises:
   detecting, by the processor, a capacitance value of each node in the touchscreen;
   comparing, by the processor, the capacitance value of each node with a preset capacitance value of each node to determine N target nodes, wherein N comprises an integer greater than or equal to zero, and wherein the capacitance values of the N target nodes exceed the preset capacitance value;
   determining, by the processor, whether an abnormal node is part of the N target nodes when the capacitance values of the N target nodes exceed the preset capacitance value, wherein the abnormal node comprises a target node determined when no touch operation occurs on the touchscreen; and
   discarding, by the processor, a row value, a column value, and a capacitance variation value of the abnormal node when the abnormal node is part of the N target nodes.

2. The method of claim 1, further comprising calibrating the capacitance variation value of the abnormal node by:
   determining, by the processor, whether the abnormal node comprises a node within a touch area, wherein the touch area comprises an area on the touchscreen in which the touch operation occurs; and
   determining, by the processor, an average value of capacitance variation values of all nodes within the touch area except the abnormal node as the capacitance variation value of the abnormal node when the abnormal node comprises the node within the touch area.

3. The method of claim 2, wherein determining whether the abnormal node comprises the node within the touch area comprises:
   determining, by the processor, whether a capacitance value of at least one neighboring node of the abnormal node varies; and
   determining, by the processor, that the abnormal node comprises the node within the touch area when the capacitance value of the at least one neighboring node varies.

4. The method of claim 1, wherein the capacitance value of the target node exceeds the preset capacitance value of the target node by a preset ratio.

5. The method of claim 1, wherein the capacitance value of the target node exceeds the preset capacitance value of the target node by a preset percentage.

6. The method of claim 1, wherein the abnormal node has a capacitance value that exceeds the preset capacitance value by thirty percent or more.

7. The method of claim 1, further comprising detecting, by the processor, whether two or more abnormal nodes exist within a preset distance threshold.

8. The method of claim 7, further comprising prompting, by the processor, a user to replace the touchscreen when the two or more abnormal nodes exist within the preset distance threshold.

9. A method for improving fault tolerance of a touchscreen of a user device, wherein the user device comprises the touchscreen a memory, and a processor coupled to the touchscreen and the memory, wherein the touchscreen comprises a plurality of nodes, and wherein the method comprises:
   detecting, by the processor, a capacitance value of each node in the touchscreen;
   comparing, by the processor, the capacitance value of each node with a preset capacitance value of each node to determine N target nodes, wherein N comprises an integer greater than or equal to zero, and wherein the capacitance values of the N target nodes exceed the preset capacitance value;
   determining, by the processor, whether an abnormal node is part of the N target node when the capacitance values of the N target node exceeds the preset capacitance value, wherein the abnormal node comprises a target node determined when no touch operation occurs on the touchscreen; and
   calibrating, by the processor, a capacitance variation value of the abnormal node and uploading a row value, a column value, and a calibrated capacitance variation value of the abnormal node when the abnormal node is part of the N target nodes.

10. The method of claim 9, wherein calibrating the capacitance variation value of the abnormal node comprises:
    determining, by the processor, whether the abnormal node comprises a node within a touch area, wherein the touch area comprises an area on the touchscreen in which the touch operation occurs; and
    determining, by the processor, an average value of capacitance variation values of all nodes within the touch area except the abnormal node as the capacitance variation value of the abnormal node when the abnormal node comprises the node within the touch area.

11. The method of claim 10, wherein determining whether the abnormal node comprises the node within the touch area comprises:
    determining, by the processor, whether a capacitance value of at least one neighboring node of the abnormal node varies; and
    determining, by the processor, that the abnormal node comprises the node within the touch area when the capacitance value of the at least one neighboring node varies.

12. The method of claim 9, wherein the capacitance value of the target node exceeds the preset capacitance value of the target node by a preset ratio.

13. The method of claim 9, wherein the capacitance value of the target node exceeds the preset capacitance value of the target node by a preset percentage.

14. A touchscreen terminal, comprising:
    a touchscreen comprising a plurality of nodes; and
    a processor coupled to the touchscreen and configured to:
      detect a capacitance value of each node in the touchscreen;
      compare the capacitance value of each node with a preset capacitance value of each node to determine N target nodes, wherein N comprises an integer greater than or equal to zero, and wherein the capacitance values of the N target nodes exceed the preset capacitance value;
      determine whether an abnormal node is part of the N target nodes when the capacitance values of the N target nodes exceed the preset capacitance value, wherein the abnormal node comprises a target node determined when no touch operation occurs on the touchscreen; and discard a row value, a column value, and a capacitance variation value of the abnormal node when the abnormal node is part of the N target nodes.

15. The touchscreen terminal of claim 14, wherein the processor is further configured to:
    determine whether the abnormal node comprises a node within a touch area, wherein the touch area comprises an area on the touchscreen in which the touch operation occurs; and
    determine an average value of capacitance variation values of all nodes within the touch area except the abnormal node as the capacitance variation value of the abnormal node when the abnormal node comprises the node within the touch area.

16. The touchscreen terminal of claim 15, wherein when determining whether the abnormal node comprises the node within the touch area, the processor is further configured to:
    determine whether a capacitance value of at least one neighboring node of the abnormal node varies; and
    determine that the abnormal node comprises the node within the touch area when the capacitance value of the at least one neighboring node varies.

17. The touchscreen terminal of claim 14, wherein the processor is further configured to:
    detect the capacitance value of each node in the touchscreen when no touch operation occurs on the touchscreen; and
    compare the capacitance value of each node with the preset capacitance value of each node to determine M abnormal nodes, wherein M comprises an integer greater than or equal to zero.

18. The touchscreen terminal of claim 17, wherein the processor is further configured to:
    determine whether a distance between any two of the M abnormal nodes is less than or equal to a preset distance threshold when M is greater than or equal to two; and
    generate prompt information to prompt a terminal user to replace the touchscreen when the distance between the any two of the M abnormal nodes is less than or equal to the preset distance threshold.

19. The touchscreen terminal of claim 14, wherein the capacitance value of the target node exceeds the preset capacitance value of the target node by a preset ratio.

20. The touchscreen terminal of claim 14, wherein the preset condition comprises that the detected capacitance value of the target node exceeds the preset capacitance value of the target node by a preset percentage.

* * * * *